United States Patent

Gooden et al.

[11] Patent Number: 5,808,187
[45] Date of Patent: Sep. 15, 1998

[54] FLUID LEVEL INDICATOR

[75] Inventors: James Thomas Gooden, Canton; Thomas Joseph Hrubovsky, Tecumseh, both of Mich.

[73] Assignee: Ford Global Technologies, Inc., Dearborn, Mich.

[21] Appl. No.: 825,516

[22] Filed: Mar. 31, 1997

[51] Int. Cl.[6] .................................................. G01M 15/00
[52] U.S. Cl. .......................... 73/118.1; 73/290 R; 73/428
[58] Field of Search ................................ 73/46, 49.7, 116, 73/118.1, 290 R, 291, 428; 184/1.5, 8, 103.1, 104.2; 137/393, 395

[56] References Cited

U.S. PATENT DOCUMENTS

| | | | |
|---|---|---|---|
| 3,590,857 | 7/1971 | Gruett | 184/103.1 |
| 3,662,858 | 5/1972 | Peterson | 184/103 R |
| 4,989,560 | 2/1991 | Rasdal et al. | 184/103.1 |
| 5,667,195 | 9/1997 | McCormick | 184/1.5 |

Primary Examiner—Ronald L. Biegel
Assistant Examiner—Eric S. McCall
Attorney, Agent, or Firm—James J. Dottavio

[57] ABSTRACT

In a motor vehicle which includes a reservoir for holding fluid, a device for determining whether the fluid level within the reservoir exceeds a desired level, the reservoir having an aperture and a standpipe sealingly engaged with the reservoir at the aperture. The standpipe defines a passage for the flow of excess fluid from the reservoir and a proper fluid level in the reservoir. A plug selectively prevents passage of the fluid through the standpipe out of the reservoir.

22 Claims, 2 Drawing Sheets

FLUID LEVEL INDICATOR

FIELD OF THE INVENTION

The present invention relates to a method and article for measuring fluid levels in a motor vehicle.

BACKGROUND OF THE INVENTION

In a motor vehicle, the fluid level, for example the automatic transmission and the engine oil level, are typically measured by inserting a dipstick into the top of a reservoir which holds the fluid. The dipstick is removably extended into the oil reservoir from the top of the reservoir into the fluid. The dipstick is graduated to be read upon removal from the reservoir. Thus, as the dipstick is inserted more deeply into the fluid, a higher level of the fluid is indicated. These dipstick configurations are well known and often used in the industry.

Situations occur in modern vehicles where package space does not provide for a convenient location to mount such a dipstick design accessible from the top of the motor vehicle. In such a environment, it would be desirable to provide a method of measuring the oil from the bottom of the oil reservoir. Furthermore, in many instances the dipstick may contact the sides of the tube in which it is inserted and pick up fluid on the sides of the tube and provide inaccurate readings. The dipstick may also not be inserted completely and provide a further erroneous reading. It would be desirable in such instances to provide a more accurate fluid level indication.

SUMMARY OF THE INVENTION

In accordance with the objects of this invention, an improved device and method are described to measure the fluid level from a fluid reservoir. The device includes a fluid reservoir having an aperture therein, a standpipe defining a passage for the flow of excess fluid from the reservoir and a plug to stop flow of fluid form the standpipe. The standpipe is sealingly engaged with the reservoir at the aperture. The standpipe has a length to establish the proper level of the fluid in the reservoir.

Advantages of the present design include improved packaging of the measurement system, improved access to the measurement system, and better measurement techniques having greater accuracy. The measurement techniques described herein further provide an advantage of more accurate and foolproof filling of the reservoir.

DETAILED DESCRIPTION OF PREFERRED EMBODIMENTS

Figure 1:
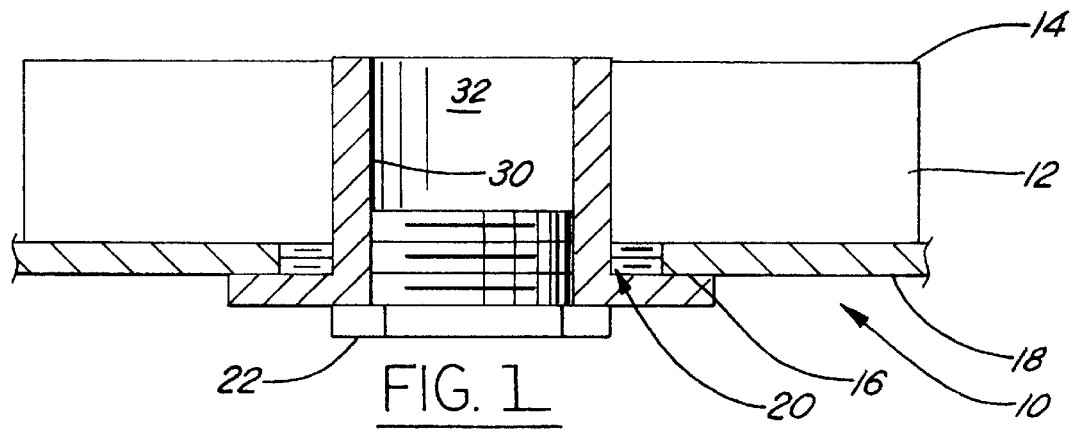
FIG. 1 is a partial cross-sectional view of a fluid reservoir including a fluid level measurement device according to the present invention.

In a motor vehicle, a reservoir 10, such as an engine or transmission oil pan, is provided to hold a quantity of fluid 12, such as oil, for lubrication and/or cooling. The fluid 12 is maintained at a predetermined level 14 to ensure the fluid 12 is available for its desired purpose. The reservoir 10 typically includes a low point 16 in the bottom 18 of the reservoir 10 where a hole 20 is provided for service drainage of the fluid 12. A plug, preferably a threaded plug 22, is removably threadably engaged with the hole 20, retains the fluid 12 in the reservoir 10 while the fluid 12 is not being drained. The plug 22 resembles a bolt having a threaded end and a second end with a hex head for removable engagement using a standard wrench and sealing engagement with the reservoir 10.

A reservoir 10 according to the present invention includes a standpipe 30 preferably provided at the low point 16 of the reservoir 10. The standpipe 30 is threadably engaged in the hole 20 in the bottom of the reservoir 18 and a plug 22 is threaded into the standpipe 30 for selectively preventing fluid flow through the standpipe 30. When the standpipe 30 is threaded into the reservoir 10, fluid 12 may be poured into the reservoir 10 and retained therein by the standpipe 30. When the fluid fills 12 the reservoir 10 to a desired level, the fluid 12 reaches the top of the standpipe 30. Once the fluid 12 passes the top of the standpipe 30, excess fluid 12 will drain into the center 32 of the standpipe 30. When the plug 22 is threadably loosened from the standpipe, the excess fluid 12 will flow through the center 32 of the standpipe 30 and out of the reservoir 10 to prevent overfilling. Furthermore, the standpipe 30 is preferably threaded to the reservoir 10 so as to be unthreaded to enable the fluid to be drained from the reservoir 10, particularly to enable the fluid to be serviced.

A standpipe 30 as shown in FIG. 1 is beneficial because the level of the fluid is controlled by the length of the standpipe 30, and excess fluid 12 pours out of the reservoir 10 if overfilled. If the reservoir 10 is underfilled, fluid 12 will not flow out of the reservoir, providing a visual indication that the desired fluid level 14 has not been achieved. The present invention enables filling the reservoir 10 from a remote location from the standpipe 30, and the standpipe 30 is monitored until fluid 12 flows therefrom, upon which time the reservoir 10 is filled to the desired level 14. Thereafter, a plug 22 is threaded into the bottom of the standpipe 30 to prevent fluid 12 flow from the reservoir 10 during operation of the vehicle. To drain the fluid 12 from the reservoir 10, the standpipe 30 is threadably removed from the reservoir 10 and fluid 12 is drained from the reservoir 10 through the hole 20 from which the standpipe 30 was removed. Furthermore, the standpipe 30 may preferably be removed to permit drainage of the fluid 12.

One skilled in the art recognizes the design shown in FIG. 1 may be calibrated such that the length of the standpipe 30 would indicate the level of the fluid at a fill temperature (typically a cold temperature). However, during operation of the vehicle, the fluid 12 volume increases and therefore fluid will overflow the standpipe when the fluid becomes hot, so as the plug 22 is removed, fluid would escape the reservoir 10 and create a spill. Therefore it is preferred that the length of the standpipe 30 shown in FIG. 1 is calibrated for the fluid level at operating temperature and the reservoir is filled and checked with the fluid at operating temperature.

Figure 2:
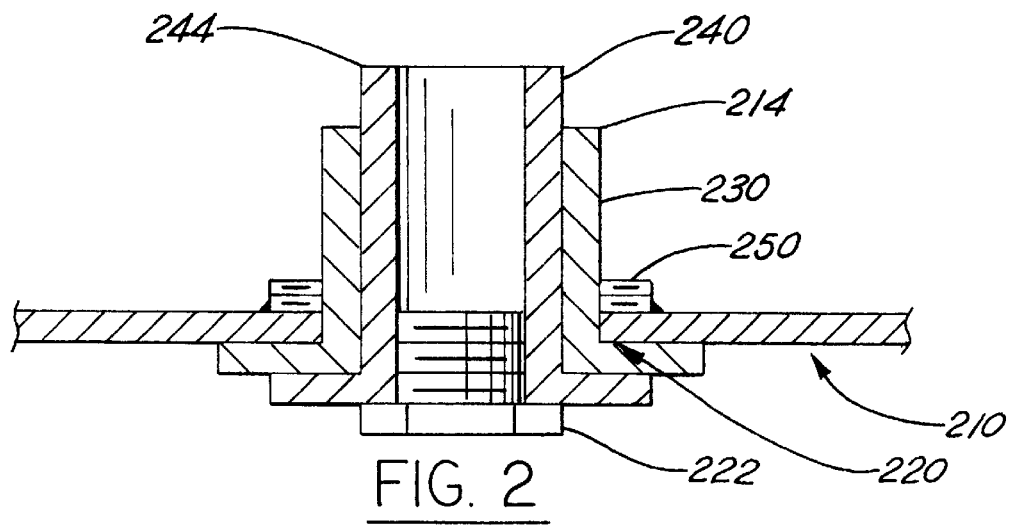
FIG. 2 is an alternate embodiment for the measurement device shown in FIG. 1.

Because in many instances it is preferred to fill the fluid at a lower temperature than the operating temperature, an alternative design, such as that illustrated in FIG. 2 is provided to accommodate fluid measurements at hot and cold temperatures. A first standpipe 230 is welded to the fluid reservoir 210. In a referred embodiment, the standpipe 230 is threadably engaged with the reservoir 210 to permit drainage of the fluid as described above with reference to FIG. 1. The length of the first standpipe 230 is calibrated to indicate a first fluid level 214 at cold temperatures as described above. A second standpipe 240 is threadably engaged with the first standpipe 230. The second standpipe 240 has a second length to indicate a second fluid level 244. The length of the second standpipe 240 is calibrated to indicate an operating temperature of the fluid, since as the fluid temperature rises, the level increases until the reservoir is filled to the second level 244 as described above.

One skilled in the art recognizes that the design of FIG. 2 illustrates one configuration and the orientation of the standpipes 230, 240 may be reversed, such that the long standpipe 240 may be threaded to the reservoir 210 and the shorter standpipe 230 received therein. Furthermore, the fluid levels may indicate a minimum and maximum level instead of the hot and cold fluid levels. In such a design, the plug 222 would be removed to indicate whether the fluid exceeds a maximum level. If the level does not exceed such an amount, the longer standpipe would be removed until fluid flows from the reservoir 210 to indicate a level above the minimum. If no fluid flows, then the fluid level would be deemed inadequate and additional fluid should be added.

In the embodiment shown FIG. 2, during fluid fill, the second standpipe 240 is threadably disengaged from the first standpipe 230 and the cold fluid is filled until it overflows the first standpipe 230, indicating the fluid has reached the desired level for a cold fill. The second standpipe 240 is then threaded into the first standpipe and the plug 222 is threadably engaged thereto.

During operation of the motor vehicle, the fluid is warmed and the fluid volume increases until the fluid reaches a level adjacent the top 244 of the second standpipe 240. To determine if the fluid is at a proper level, the plug 222 is removed to determine if fluid overflows the second standpipe 230. If fluid does not overflow the second standpipe 230 at operating temperatures, additional fluid may be added until the fluid does overflow the second standpipe 240, indicating the fluid level is proper for operating temperatures. The embodiment shown in FIG. 2 also enables the level of the fluid to be checked at cold temperatures. At cold temperatures, the second standpipe 240 is threadably removed from the first standpipe 230. If the fluid level does not exceed the length of the standpipe, more fluid may be added until it over flows the top 214 of the second standpipe 230 to establish a proper fluid level at cold temperature.

One skilled in the art also recognizes the reservoir 10 thickness shown in FIG. 1 may be not be adequate to threadably engage the standpipe 30, therefore it is preferred that, as shown in FIG. 2, a nut 250 is welded to the upper surface of the reservoir 210 to engage the standpipe 230 and retain the standpipe 230 to the reservoir 210. Radial holes or groves (not shown) may be provided in the threaded nut 250 to permit fluid drainage from the reservoir 210 at a level below the nut 250, or the nut 250 may elevated from the reservoir 210 using bosses (not shown) on the nut 250 abutting the reservoir 210 or indentations (not shown) in the reservoir 210 adjacent the nut 250 to permit service of the fluid. In the embodiment shown FIG. 2, the first standpipe 230 may alternatively be sealingly welded to the reservoir 210 around the hole 220 provided in the bottom of the reservoir 210 and an alternate drainage point is provided.

Figure 3:
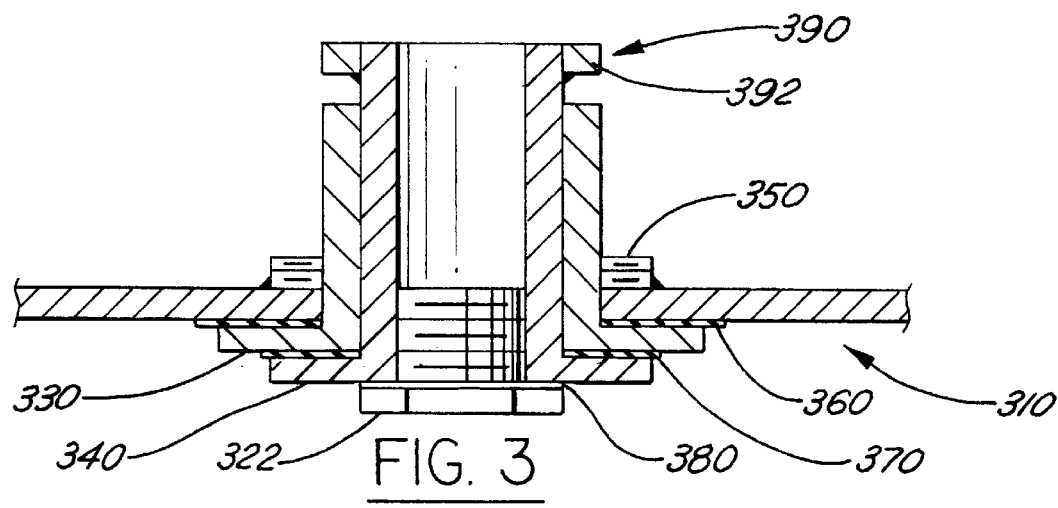
FIG. 3 is an embodiment for a retainer for the device shown in FIG. 2.

As shown in FIG. 3, one skilled in the art recognizes a gasket 380 may be provided between the plug 322 and the second standpipe 340 or the second standpipe 340 and the first standpipe 330 to improve the fluid sealing therebetween. Such gaskets are well known in the art and are not described further herein.

In a preferred embodiment shown in FIG. 3, the second standpipe 340 includes a means 390 for retaining the second standpipe to the first standpipe 330 so the second standpipe 340 is not lost during a fluid check. A preferred retention means 390 includes a flange 392 welded at the top of the second standpipe 340 to retain the second standpipe 340 to the first standpipe 330 as shown in FIG. 3. Similarly this flange 390 may be provided by flaring out the top of the second standpipe 340 or bending a tab (not shown) therefrom to insure the second standpipe 340 is not removed. This is particularly useful when checking hot fluid, as it is not desirable to grasp the second standpipe 340 when it is removed.

Figure 4:
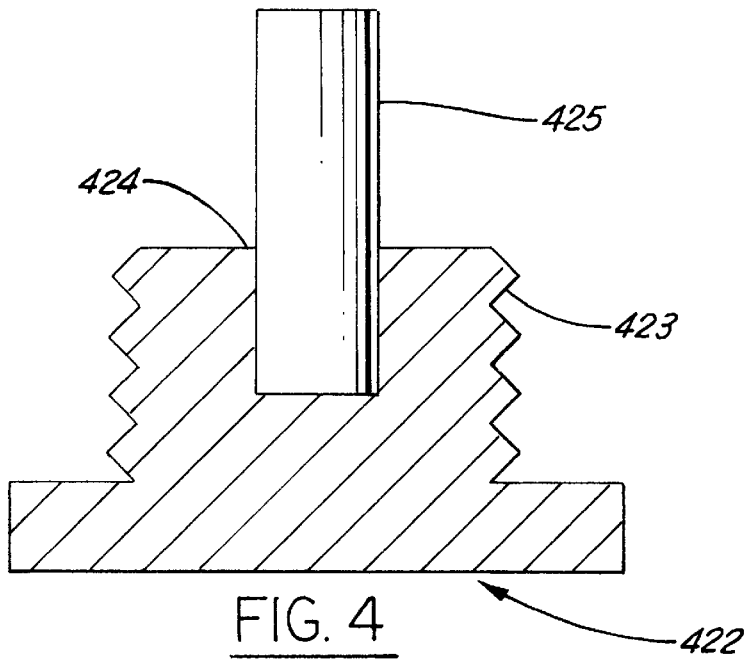
FIG. 4 is a view of a plug for use with the devices shown in FIGS. 1–3 having a means to indicate the temperature.

FIGS. 2 and 4 illustrate a welded nut 250, 350 to retain the first standpipe 230, 330. Alternatively this standpipe 230, 330 is threadably engaged to the bottom of the reservoir 210, 310 as described above with reference to FIG. 1. Although not illustrated for sake of clarity, the standpipes 230, 240 and 330, 340 preferably have a radial clearance therebetween so the fluid may escape between the two standpipes when the first (shorter) standpipe 230 level 214 is exceeded and the second standpipe 240 is threadably loosened from the first standpipe 230.

As shown in FIG. 4, a preferred plug 422 is provided for use with any of the present embodiments, but particularly those shown in FIGS. 2 or 3. The plug 422 includes a means for determining the temperature of the fluid. This plug 422 includes a preferably metallic portion 423 as is known in the art to sealingly act as a plug for the fluid reservoir. However the plug 422 preferably further includes an axial extending hole 424 therein. A plastic indicator 425 is retained within this hole 424 in the plug 422. The plastic indicator 425 is made with a thermochromic material, such as liquid crystals or thermochromic dye, and may be molded into the plug 422 or otherwise retained by the plug 422. The liquid crystals or dye can be added to the plastic when the plug is molded and retained within the nut. These materials are engineered to change color at the operating temperature of the fluid in the transmission. In a preferred embodiment, the operating temperature of the fluid is approximately 150° F. and the cold temperature is approximately 70° F.

An example of such thermochromic materials is known commercially as ChromaZone®, supplied by Davis Liquid Crystals of San Leandro, Calif. Alternative suppliers of materials having the desired characteristics include Charkit, of Darien, Conn. and Matsui, of Gardenia, Calif. One skilled in the art understands the methods by which these materials are selected and molded, so they are not explained further herein.

Figure 5:
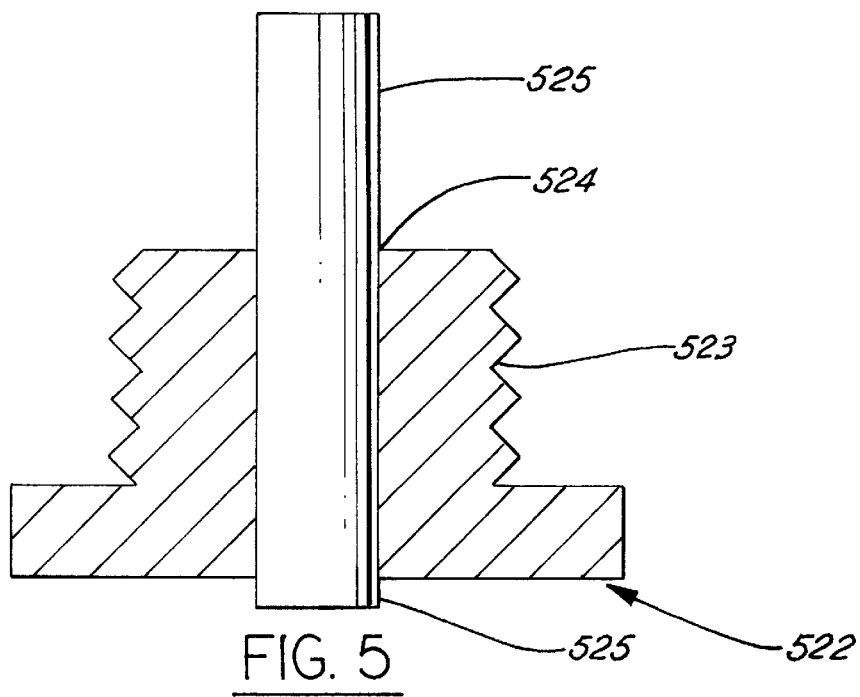
FIG. 5 is an alternative embodiment for the plug shown in FIG. 4.

A further embodiment of the plug 422 shown in FIG. 4 is shown in FIG. 5. In FIG. 5, the hole 524 in the plug 522 extends therethrough, and the plastic material 525 is visible from the end of the nut outside the reservoir. Thus, the temperature of the fluid may be determined by visual inspection of the nut 525 prior to removing the nut 525. Therefore, if the nut 525 indicates the fluid temperature is hot, the nut 525 is first removed to determine whether the fluid overflows the longer standpipe 240 shown in FIG. 2. If the fluid does not overflow the second standpipe 240, fluid may be added or the second standpipe 240 may be removed to determine if the fluid level exceeds the level of the first standpipe 230. Furthermore, if the temperature is at the cold or low fluid temperature, the second standpipe 240 may be removed and the level of the fluid may be determined at the cold operating temperature at the level of the first standpipe 230. Alternatively, a thermochomic strip may be provided on the surface of the reservoir (not shown) to indicate the temperature of the reservoir and thus the fluid temperature.

One skilled in the art further recognizes that the plastic material in the nut may be molded to a shape which threadably engages the inside diameter of the standpipe 220 and serves as a substitute for the nut 222. Therefore, the steel portion 423 of the nut 422 shown in FIG. 4 is eliminated and the temperature may be determined by visually inspecting the temperature sensitive plug.

Figure 6:
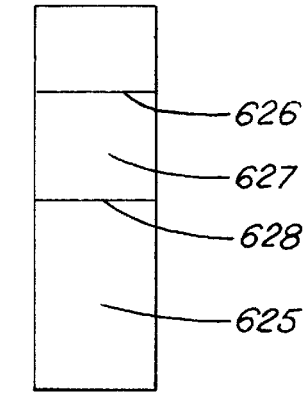
FIG. 6 is a modification of a plug according to FIG. 5 or 6.

A further alternative embodiment of the plastic material 425, 525 shown in FIGS. 4 and 5 is illustrated in FIG. 6. In this embodiment, the material 625 is molded with a longitudinal portion 627 having pair of lines 626, 628 to indicate a min fill and max fill level, or hot and cold fill levels. In a preferred embodiment, the material is molded to a color similar to the fluid to be measured at cold temperature. Thus, due to the color of the materials at cold temperatures, it would be difficult to read the fluid on the plastic material 625 if measured cold, as the fluid will appear the same color as the material 625. When the material 625 is heated to operating temperature, the material 625 becomes a different color, for example, white, and the fluid level is easily read thereon. Alternatively, the lines 626, 628 could be molded to the same color as the base material 625 when cold, so the lines 626, 628 are not visible when viewed cold. When heated, the lines appear and are then useful to determine the level of the fluid. A plug 522 using the material 625 as described with reference to FIG. 6 may be used in any of the applications as described above, or such a plug may directly replace an existing oil pan plug and the longitudinal portion 627 has a length which extends to the level of the fluid.

Furthermore, the principles described herein with reference to FIG. 6 may be used in an application where a dipstick is used to measure fluid level from the top of the reservoir. In such an instance, the material 625 is provided on a dipstick (not shown) to change color to measure the fluid as described in the prior paragraph above describing a plug with reference to FIG. 6.

One skilled in the art recognizes the standpipes illustrated in the Figures are preferably oriented vertically. Although not literally a standpipe due to its orientation, one skilled in the art recognizes a standpipe could alternatively project horizontally within the reservoir at a predetermined height to indicate the fluid level. The height at which the horizontal standpipe is mounted on the reservoir establishes the proper fluid level in this embodiment, versus the length of the standpipe as discussed above. Furthermore, a pair of such horizontal standpipes could be provided at different heights on the reservoir to establish a min and max fluid level or hot and cold fluid levels.

One skilled in the art further recognizes the present invention may be utilized in an application with an existing vehicle. An example of such an application includes removing the existing oilpan nut and installing a standpipe according to the present invention as described above with reference to the Figures. Furthermore, these principles may be applied to several fluids, including engine oil, transmission fluid, engine coolant, windshield washer fluid, brake fluid, differential fluid, and any other such fluids.

It is to be understood that this specific mechanisms and techniques which have been described are merely illustrative of application of the principles of the present invention. Numerous modifications may be made to the method and apparatus described herein without departing from the true spirit and scope of the invention.

We claim:

1. In a motor vehicle which includes a reservoir for holding a desired volume of fluid represented by a fluid level, a device for determining whether the fluid level within the reservoir exceeds a desired level comprising:

said reservoir having an aperture therein;

a standpipe defining a passage for the fluid in excess of the desired volume to flow from the reservoir, said standpipe sealingly engaged with the reservoir at the aperture, said standpipe indicating a first fluid level in the reservoir, said standpipe being threadably engaged with the reservoir providing a means for draining the reservoir, the standpipe being vertically oriented having a length indicating the first fluid level; and a plug to selectively prevent passage of the fluid through the standpipe out of the reservoir, said plug including an indicator to indicate the temperature of the fluid.

2. In a motor vehicle which includes a reservoir for holding a desired volume of fluid represented by a fluid level, a device for determining whether the fluid level within the reservoir exceeds a desired level comprising:

said reservoir having an aperture therein;

a first standpipe defining a passage for the fluid in excess of the desired volume to flow from the reservoir, said first standpipe sealingly engaged with the reservoir at the aperture, said first standpipe indicating a first fluid level in the reservoir and said first standpipe providing a means for draining the reservoir;

a second standpipe sealingly engaged with the reservoir, said second standpipe indicating a second fluid level in the reservoir; and a plug to selectively prevent passage of the fluid through one of the standpipes out of the reservoir.

3. A device according to claim 2, wherein the first and second standpipes are vertically oriented, the first standpipe having a first length to indicate the first fluid level and the second standpipe having a second length to indicate the second fluid level.

4. A device according to claim 3, wherein the second standpipe is alternatively sealingly engageable and disengageable with the first standpipe.

5. A device according to claim 4, wherein the plug is removably sealingly engaged with the second standpipe.

6. A device according to claim 5, wherein the plug further comprises a temperature indicator to indicate which of said standpipes is to be used to measure the fluid level.

7. A device according to claim 6, wherein the temperature indicator comprises a thermochromic material.

8. A device according to claim 6, wherein the temperature indicator is visible without disengaging a standpipe from the reservoir.

9. A device according to claim 5, further comprising a retainer provided on the second standpipe to allow drainage of fluid from the second standpipe but to prevent complete removal of the second standpipe from the first standpipe.

10. A device according to claim 1, wherein the standpipe and plug comprise a threaded plug engaged with the standpipe, the threaded engagement defining the fluid passage, the plug having a temperature indicator extending therefrom, the standpipe having a length to indicate the fluid level.

11. A device according to claim 10, wherein the temperature indicator comprises a thermochromic material.

12. In a motor vehicle which includes a reservoir for holding a desired volume of fluid represented by a fluid level, a device for determining whether the fluid level within the reservoir exceeds a desired level comprising:

said reservoir having a bottom surface having an aperture therein;

a standpipe defining a passage for the fluid in excess of the desired volume to flow from the reservoir, said standpipe sealingly engageable and disengageable with the reservoir at the aperture, said standpipe having a length defining a fluid level in the reservoir; and a plug to selectively prevent passage of the fluid through the standpipe out of the reservoir, said plug including an indicator to indicate the temperature of the fluid.

13. A device according to claim 12, further comprising a second standpipe sealingly engaged with the reservoir, said second standpipe having a second length indicating a second fluid level in the reservoir.

14. A device according to claim 13, wherein the second standpipe is sealingly engaged with the first standpipe and the plug is sealingly engaged with the second standpipe.

15. A device according to claim 14, wherein the plug further comprises a temperature indicator to indicate which of said standpipes is to be used to measure the fluid level.

16. In a motor vehicle which includes a reservoir for holding fluid, the reservoir having a standpipe projecting therein defining a fluid level and a plug for sealing the standpipe and a drain plug having an indicator to indicate a temperature of the fluid, a method for determining whether the fluid level within the reservoir exceeds a desired level, comprising:

observing the indicator to determine if the fluid temperature is proper to measure the fluid level;

sealingly disengaging the plug from the standpipe;

observing the standpipe to determine whether the fluid flows from the reservoir through the standpipe; and adding fluid to the reservoir until the fluid flows through the standpipe.

17. In a motor vehicle which includes a reservoir for holding a measure of fluid, the reservoir having a first standpipe projecting therein defining a first fluid level, a second standpipe projecting therein defining a second fluid level, a first sealing means for sealing the first standpipe and a second sealing means for sealing the second standpipe, a method for determining whether the measure of fluid within the reservoir exceeds a desired level, comprising:

sealingly disengaging the second sealing means from the second standpipe;

observing the second standpipe to determine whether the fluid flows from the reservoir through the second standpipe; and if fluid did not flow from the second standpipe, sealingly disengaging the first sealing means from the first standpipe and observing the first standpipe to determine whether the fluid flows from the reservoir through the first standpipe.

18. The method according to claim 17 wherein the step of removing the first sealing means comprises threadably removing the second standpipe from the first standpipe.

19. The method according to claim 17 further comprising the step of adding fluid to the reservoir until fluid flows through the second standpipe.

20. In a motor vehicle which includes a reservoir for holding a measure of fluid, the reservoir having a first standpipe projecting therein defining a first fluid level, a second standpipe projecting therein defining a second fluid level, a first sealing means for sealing the first standpipe, a second sealing means for sealing the second standpipe, and an indicator for indicating a temperature of the fluid, a method for determining whether the measure of fluid within the reservoir exceeds a desired level, comprising:

observing the temperature indicator to determine if the fluid is warm or cold; and sealingly disengaging the first sealing means if the fluid is cold;

sealingly disengaging the second sealing means if the fluid is warm; and observing the reservoir to determine whether the fluid flows through the standpipe from which the sealing means was removed.

21. The method according to claim 20 further comprising the step of adding fluid to the reservoir until fluid flows through the standpipe from which the sealing means was sealingly disengaged.

22. The method according to claim 17 further comprising the step of adding fluid to the reservoir until fluid flows through the first_standpipe.

* * * * *